Sept. 10, 1935.   G. C. DE COUTOULY   2,014,228
VARIABLE ATTENUATOR
Filed Feb. 24, 1933

INVENTOR
G.C. DE COUTOULY
BY
G H Stevenson
ATTORNEY

Patented Sept. 10, 1935

2,014,228

UNITED STATES PATENT OFFICE 2,014,228

VARIABLE ATTENUATOR

Gustave C. de Coutouly, Madison, N. J., assignor to Bell Telephone Laboratories, Incorporated, New York, N. Y., a corporation of New York Application February 24, 1933, Serial No. 658,377

6 Claims. (Cl. 178—44)

This invention relates to variable attenuators or couplers and has for its object to provide a coupling circuit which may be continuously varied to provide a very wide range of attenuation.

In a specific preferred embodiment the invention comprises an attenuator of the variable capacity type having two sets of rotor plates insulated and shielded from each other, and two sets of stator plates so arranged that when the rotor is in one extreme position each set of rotor plates meshes with a corresponding set of stator plates and when the rotor is turned through 180 degrees to the other extreme position the sets of rotor plates mesh with the respective other sets of stator plates. One set of rotor plates and one set of stator plates are connected together to the grounded terminals of the two circuits which it is desired to couple. The other set of stator plates and the other set of rotor plates are connected respectively to the other terminals of the two circuits. In this way, when the rotor is in the position in which the last mentioned set of rotor plates is meshed with the last mentioned set of stator plates the two circuits will be coupled through the capacity between these two sets of plates and the coupling will be a maximum. On the other hand, when the rotor is in the opposite position a capacity representing the capacity between a set of rotor and a set of stator plates will be shunted across each circuit and the two circuits coupled together by the relatively small capacity between the sets of rotor plates, thus giving a minimum coupling between the two circuits. As the rotor is being moved between these two positions the coupling between the circuits will be continuously varied from one extreme value to the other. It has been found that with a variable coupling device of this type, the coupling between two circuits can be continuously varied through a range of attenuation of the order of 75 db.

Figure 1:
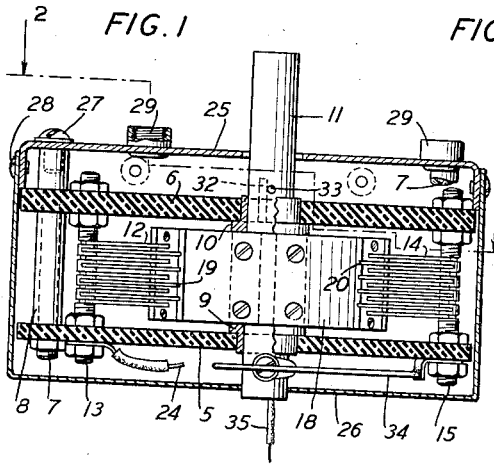
Figure 2:
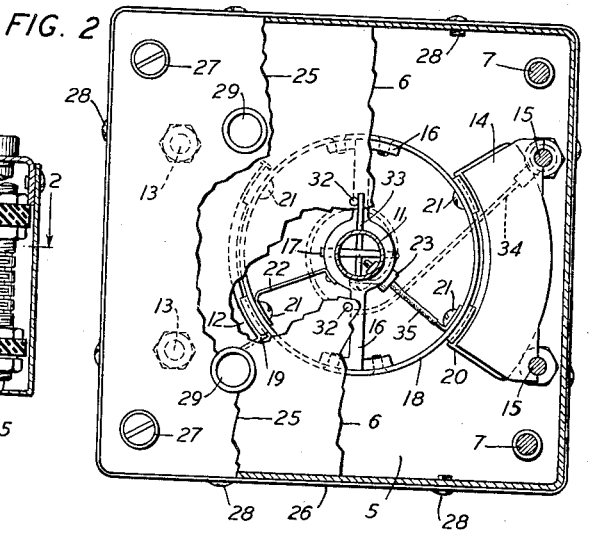
Figure 3:
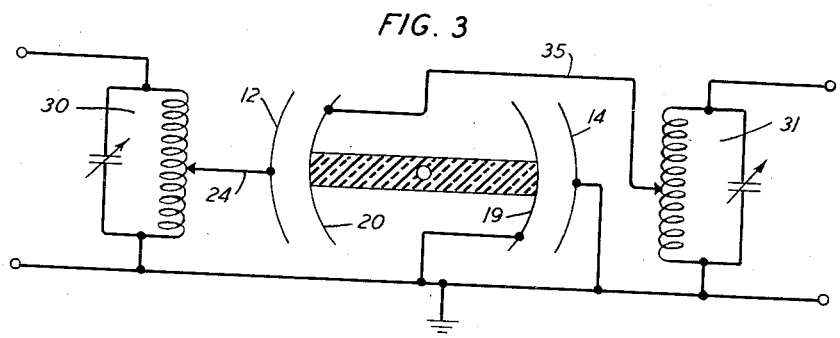
Figure 4:
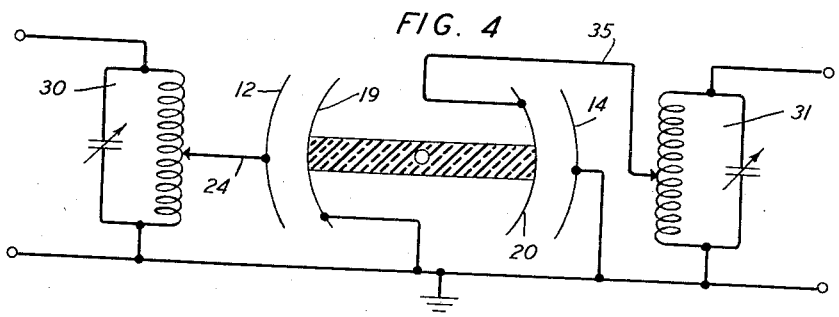

The invention can be more readily understood by reference to the following detailed description in connection with the drawing in which Figs. 1 and 2 show the mechanical construction of the variable attenuator, Fig. 1 being a vertical cross-sectional view taken through the center of Fig. 2 and Fig. 2 being a plan view partially in section taken approximately along the lines 2—2 of Fig. 1; and Figs. 3 and 4 show schematically the schematic arrangement of the variable coupler shown in Figs. 1 and 2 when used for coupling two circuits, Fig. 3 showing the condition for maximum coupling and Fig. 4 showing the condition for minimum coupling.

Referring to Figs. 1 and 2, the variable coupling condenser is built on a framework constructed of a lower plate 5 and an upper plate 6, both made of the insulating material, which are held together by four bolts 7 provided with cylindrical heads and carrying hollow cylindrical spacers 8 for maintaining the proper separation between the plates 5 and 6. The plates 5 and 6 have holes bored near the centers thereof in which are fitted the respective bearing members 9 and 10 which carry the hollow shaft 11, on which is mounted the rotor member to be described in detail later.

A set of stator plates 12 is mounted between the frame plates 5 and 6 by means of the machine bolts 13. A second set of stator plates 14 is mounted between the frame plates 5 and 6 at a point diametrically opposite with respect to the rotor shaft 11 by means of the machine bolts 15.

The rotor element is built on a web-shaped casting 16 which is fastened to the rotor shaft 11 by means of a taper pin 17. The casting 16 serves the double function of shielding two sets of rotor blades 19 and 20 from each other, and of supporting the insulating cylindrical member 18 on which the rotor blades are mounted. The sets of rotor blades 19 and 20 are attached to member 18 by screws 21 and are mounted with their center lines normal to the center line of the web member 16.

The stator plates 14 are connected to the rotor shaft 11 by means of a hair spring connector 34. The rotor blades 19 are also connected to the shaft through the web member 16 by means of the connecting link 22. Thus the shaft forms one of the three terminals of the unit. The second connection to the variable attenuator unit is made from the set of stator blades 20 through the flexible connection 35 running through the bushing 23 in the web member 16 and the hollow shaft 11. A wire 24 connected to one of the mounting bolts 13 provides a connection to the other set of stator blades 12 and the third terminal or the variable attenuator.

A pin 33 driven through a hole in the shaft 11 and two stops 32 mounted in the plate 6 limit the movement of the rotor.

A cover plate 25 and a box member 26 are provided for mounting and shielding the unit. The cover plate 25 is secured to the frame of the unit by means of screws 27 which are screwed into tapped holes in the cylindrical heads of the spacing bolts 7. The box portion 26 is secured to the cover portion 25 by means of screws 28. Tapped cylinders 29 which are staked to the cover portion 25 provide means for mounting the unit.

Figs. 3 and 4 show diagrammatically the method of connecting the variable attenuator for coupling the two tuned circuits 30 and 31. Fig. 4 shows the attenuator in the position shown in Figs. 1 and 2, which is the position of minimum coupling. Fig. 3 shows the variable attenuator in the other extreme position, with the rotor turned to 180 degrees, which is the position for maximum coupling. The grounded terminal from the rotor plates 19 and the stator plates 14 is connected to the two grounded terminals of the circuits 30 and 31. The other stator plates 12 are connected to the other terminal of the circuit 30 through the connection 24 and the other rotor plates 20 are connected to the other terminal of the circuit 31 through the flexible connection 35.

Referring to the position of maximum coupling shown diagrammatically in Fig. 3, it will be noted that in this position the capacity between the rotor plates 19 and the stator plates 14 is short-circuited through the ground connection and the circuits 30 and 31 coupled together through the capacity between the stator plates 12 and the rotor plates 20.

With the rotor turned through 180 degrees the rotor plates 19 now mesh with the rotor plate 12 as shown in Fig. 4, the circuit 30 is shunted by the capacity between the stator plates 12 and the rotor plates 19. Similarly, in this position, the capacity between the rotor plates 20 and the stator plates 14 shunts the terminals of the circuit 31. Furthermore, in this position the only coupling between the two circuits is through the natural capacity between the two sets of rotor plates 19 and 20 which, as described above, is kept at a minimum value by means of the shielding effect of the web member 16.

Considering the action of the variable coupler for intermediate positions, it will be noted that as the rotor is moved from the position shown in Fig. 3, the coupling between the circuits 30 and 31 will be diminished as the rotor plates 20 are brought out of mesh with the stator plate 12. Then as the 90 degree position is passed a further attenuation will be produced by the shunting effect produced by the rotor plates 20 coming into mesh with the stator plates 14 and the rotor plates 19 similarly coming into mesh with the stator plates 12 which effect will be gradually increased until the position of minimum coupling indicated in Fig. 4 is reached. Thus, a gradual variation in the coupling or attenuation is produced as the rotor is moved from the first position to the other extreme position. In practice it has been found that the attenuation between the two extreme positions can be made as high as 75 db.

In the embodiment shown and described herein each of the sets of blades covers about 80°. This permits the attainment of a desired minimum coupling while maintaining a fairly continuous variation in coupling. By decreasing the angle covered by the blades the inter-blade capacity and consequently the minimum coupling can be reduced; however, this will increase the length of the transitory region in which the rotor blades are passing from a coupling to shunting relation and consequently increase the length of that portion of the characteristic in which there is little variation in the attenuation or coupling. On the other hand, by increasing the angle covered by the blades the continuity of the attenuation characteristic may be increased but the inter-blade capacity and consequently the minimum value of coupling will also be increased.

What is claimed is:

1. In a device for variably coupling a pair of two terminal circuits having a common terminal for the transmission of electrical oscillations from one to the other, a condenser having two sets of fixed plates and two sets of movable plates adapted to mesh interchangeably with the sets of fixed plates, connections from one terminal of one of said circuits to one of said sets of fixed plates, connections from the corresponding terminal of the other of said circuits to one of said sets of movable plates and connections from the other terminals of said two circuits, respectively, to the other set of fixed plates and to the other set of movable plates, so that the coupling between said circuits may be varied through a wide range by varying the position of the sets of movable plates with respect to the sets of fixed plates.

2. In combination, two circuits each having two terminals, connections from one terminal of one of said circuits to the corresponding terminal of the other of said circuits, a set of stator plates connected to the other terminal of said one circuit, the second set of stator plates connected to the common connection of said two circuits, a first set of rotor plates connected to the other terminal of said other circuit, a second set of rotor plates connected to the second set of stator plates, said two sets of rotor plates being adapted to mesh interchangeably with said sets of stator plates whereby a maximum coupling between said circuits is obtained when said first set of rotor plates is meshed with said first set of stator plates and a minimum coupling is obtained when said first set of rotor plates is meshed with said second set of stator plates.

3. A variable capacity attenuator comprising two sets of fixed plates, two sets of movable plates so arranged that in one position one set of movable plates will mesh with one set of fixed plates and the other set of movable plates will mesh with the other set of fixed plates, and in another position said one set of movable plates will mesh with said other set of fixed plates and said other set of movable plates will mesh with said one set of fixed plates, connections between said other set of fixed plates and said one set of movable plates and to corresponding terminals of two circuits, and connections from said one set of fixed plates and from said other set of movable plates to the other terminals of the two respective circuits, so that the two circuits are coupled together for the transmission of electrical oscillations from one to the other with an attenuation which varies from a maximum in said one position to a minimum in said other position.

4. A variable capacity attenuator comprising two sets of fixed plates, two sets of movable plates so arranged that in one position one set of movable plates will mesh with one set of fixed plates, and the other set of movable plates will mesh with the other set of fixed plates, and in another position said one set of movable plates will mesh with said other set of fixed plates and other set of movable plates will mesh with said one set of fixed plates, shielding means for maintaining the capacities between said sets of movable plates at a predetermined minimum value, connections between said other set of fixed plates and said one set of movable plates and to corresponding terminals of two circuits, and connections from said one set of fixed plates and said other set of movable plates, respectively, to the other terminals of the two circuits.

5. In combination, two electrical circuits, a variable capacity attenuator for interconnecting said circuits for the transmission of electrical oscillations from one to the other and comprising a rotor element, a pair of sets of stator plates mounted at points diametrically opposite with respect to said rotor element and a pair of rotor plates mounted at diametrically opposite points on said rotor element and adapted to mesh with said sets of stator plates, connections between one set of rotor plates and one set of stator plates and two corresponding terminals of said circuits, connections from the other set of stator plates to the other terminal of one of said circuits, connections from the other set of rotor plates to the other terminal of said other circuit, and means for rotating said rotor element to continuously vary the coupling between said circuits throughout a wide range as the rotor is moved through an arc of 180 degrees.

6. In combination, two electrical circuits, a variable capacity attenuator for interconnecting said circuits and comprising a rotor element, a pair of sets of stator plates mounted at points diametrically opposite with respect to said rotor element, a pair of sets of rotor plates mounted at diametrically opposite points on said rotor element and adapted to mesh with said sets of stator plates, and a shielding element carried by said rotor element and adapted to reduce to a predetermined minimum the capacity between said sets of rotor plates, connections between one set of stator plates, one set of rotor plates and two corresponding terminals of said two circuits, and connections from the other set of stator plates to the other terminal of one of said circuits and connections from the other set of rotor plates to the other terminal of the other of said circuits.

GUSTAVE C. DE COUTOULY.